United States Patent
Ranjan et al.

(10) Patent No.: US 10,430,442 B2
(45) Date of Patent: Oct. 1, 2019

(54) SYSTEMS AND METHODS FOR AUTOMATED CLASSIFICATION OF APPLICATION NETWORK ACTIVITY

(71) Applicant: Symantec Corporation, Mountain View, CA (US)

(72) Inventors: Gyan Ranjan, Sunnyvale, CA (US); Alok Tongaonkar, San Jose, CA (US)

(73) Assignee: Symantec Corporation, Mountain View, CA (US)

( * ) Notice: Subject to any disclaimer, the term of this patent is extended or adjusted under 35 U.S.C. 154(b) by 107 days.

(21) Appl. No.: 15/064,629

(22) Filed: Mar. 9, 2016

(65) Prior Publication Data

US 2017/0262522 A1  Sep. 14, 2017

(51) Int. Cl.
*H04L 29/06* (2006.01)
*G06F 17/27* (2006.01)
(Continued)

(52) U.S. Cl.
CPC ...... *G06F 16/285* (2019.01); *G06F 16/24568* (2019.01); *G06F 16/951* (2019.01);
(Continued)

(58) Field of Classification Search
None
See application file for complete search history.

(56) References Cited

U.S. PATENT DOCUMENTS 7,644,150 B1 *  1/2010  Nucci ................. H04L 41/0893
                                                           706/12
7,864,764 B1   1/2011  Ma et al.
(Continued)

FOREIGN PATENT DOCUMENTS

CN   108886512 A   11/2018
CN   109154962 A   1/2019
(Continued)

OTHER PUBLICATIONS

Hongyi Yao et al: "SAMPLES: Self Adaptive Mining of Persistent LExical Snippets for Classifying Mobile Application Traffic", Proceedings of the 21st Annual International Conference on Mobile Computing and Networking, MOBICOM '15, Jan. 1, 2015, pp. 439-451, XP055364474, New York, New York, USA, DOI: 10.1145/2789168.2790097, ISBN: 978-1-4503-3619-2.
(Continued)

*Primary Examiner* — Fatoumata Traore
(74) *Attorney, Agent, or Firm* — FisherBroyles, LLP

(57) ABSTRACT

The disclosed computer-implemented method for automated classification of application network activity may include (1) building a lexicon dictionary that comprises lexical keywords, wherein network streams whose headers contain a given lexical keyword represent communications of an activity type that is associated with the given lexical keyword in the lexicon dictionary, (2) identifying, at a network vantage point, a network stream that represents a communication between an application and a server, (3) extracting, through a lexical analysis that utilizes the lexicon dictionary, a set of keywords from one or more header fields of the network stream, and (4) classifying the network stream based on activity types associated with each keyword in the set of keywords that were extracted from the header fields of the network stream. Various other methods, systems, and computer-readable media are also disclosed.

20 Claims, 7 Drawing Sheets

(51) Int. Cl.
| | |
|---|---|
| G06F 16/28 | (2019.01) |
| G06F 16/951 | (2019.01) |
| G06F 16/2455 | (2019.01) |
| H04L 12/26 | (2006.01) |
| H04L 12/813 | (2013.01) |
| H04L 29/08 | (2006.01) |
| G06F 21/53 | (2013.01) |
| G06F 21/56 | (2013.01) |
| H04L 12/28 | (2006.01) |

(52) U.S. Cl.
CPC ............ *G06F 21/53* (2013.01); *G06F 21/567* (2013.01); *H04L 43/062* (2013.01); *H04L 47/20* (2013.01); *H04L 63/0227* (2013.01); *H04L 63/1416* (2013.01); *H04L 67/02* (2013.01); *G06F 17/2735* (2013.01); *H04L 12/28* (2013.01)

(56) References Cited

U.S. PATENT DOCUMENTS

| | | | |
|---|---|---|---|
| 7,971,054 B1* | 6/2011 | Boisjolie | H04L 41/5022 713/154 |
| 8,087,088 B1 | 12/2011 | Pennington et al. | |
| 8,291,495 B1 | 10/2012 | Burns et al. | |
| 8,494,985 B1 | 7/2013 | Keralapura et al. | |
| 8,578,024 B1 | 11/2013 | Keralapura et al. | |
| 8,683,584 B1 | 3/2014 | Daswani et al. | |
| 8,776,168 B1 | 7/2014 | Gibson et al. | |
| 8,819,227 B1 | 8/2014 | Keralapura et al. | |
| 8,843,267 B2 | 9/2014 | Park et al. | |
| 8,843,627 B1 | 9/2014 | Baldi et al. | |
| 9,282,109 B1* | 3/2016 | Aziz | G06F 21/554 |
| 9,727,371 B2 | 8/2017 | Johnson et al. | |
| 2003/0105976 A1* | 6/2003 | Copeland, III | G06F 21/552 726/4 |
| 2008/0010683 A1 | 1/2008 | Baddour et al. | |
| 2009/0012760 A1 | 1/2009 | Schunemann | |
| 2009/0119275 A1 | 5/2009 | Chen et al. | |
| 2010/0077161 A1 | 3/2010 | Stoakes et al. | |
| 2010/0095367 A1 | 4/2010 | Narayanaswamy | |
| 2010/0211796 A1 | 8/2010 | Galley et al. | |
| 2011/0004504 A1 | 1/2011 | Ives et al. | |
| 2011/0022537 A1 | 1/2011 | Nickerson et al. | |
| 2011/0066648 A1 | 3/2011 | Abhyanker et al. | |
| 2011/0078157 A1 | 3/2011 | Sun et al. | |
| 2012/0239667 A1 | 9/2012 | Vysyaraju et al. | |
| 2012/0290330 A1 | 11/2012 | Coleman et al. | |
| 2014/0052753 A1 | 2/2014 | Zhang et al. | |
| 2014/0058915 A1 | 2/2014 | Hinesley et al. | |
| 2014/0075004 A1 | 3/2014 | Van Dusen et al. | |
| 2014/0129678 A1 | 5/2014 | Herman | |
| 2014/0172495 A1 | 6/2014 | Schneck et al. | |
| 2014/0172766 A1 | 6/2014 | Van Lunteren | |
| 2014/0282493 A1 | 9/2014 | Glover et al. | |
| 2014/0321290 A1 | 10/2014 | Jin et al. | |
| 2015/0081713 A1 | 3/2015 | Alonso et al. | |
| 2016/0094427 A1* | 3/2016 | Talat | H04L 41/0213 709/223 |
| 2016/0110819 A1 | 4/2016 | Abramowitz | |
| 2016/0173520 A1 | 6/2016 | Foster et al. | |
| 2016/0191348 A1 | 6/2016 | Lee et al. | |
| 2016/0191548 A1 | 6/2016 | Smith et al. | |
| 2016/0321452 A1 | 11/2016 | Richardson et al. | |
| 2016/0352805 A1 | 12/2016 | Seida | |
| 2017/0171906 A1 | 6/2017 | Backholm et al. | |
| 2017/0286690 A1 | 10/2017 | Chari et al. | |
| 2017/0331840 A1 | 11/2017 | Ranjan | |
| 2018/0018327 A1 | 1/2018 | Fleischman et al. | |
| 2018/0047071 A1 | 2/2018 | Hsu et al. | |

FOREIGN PATENT DOCUMENTS

| | | |
|---|---|---|
| EP | 3 427 460 A1 | 1/2019 |
| WO | 2017/155592 A1 | 9/2017 |
| WO | 2017/196463 A1 | 11/2017 |

OTHER PUBLICATIONS

Shuaifu Dai et al: "NetworkProfiler: Towards automatic fingerprinting of Android apps", INFOCOM, 2013 Proceedings IEEE, IEEE, Apr. 14, 2013, pp. 809-817, XP032440827, DOI: 10.1109/INFCOM.2013.6566868, ISBN: 978-1-4673-5944-3.

Saurabh S. Kataria, et al.; Entity Disambiguation with Hierarchical Topic Models; Aug. 21, 2011.

Andrew M. Dai, et al.; The Grouped Author-Topic Model for Unsupervised Entity Resolution; 2011.

Topic Model; https://en.wikipedia.org/wiki/Topic_model; as accessed on Dec. 14, 2016; Nov. 13, 2010.

David Newman et. al; Statistical Entity-Topic Models; SIG KDD 2006; Aug. 20, 2006.

Corporate Reputation; https://www.meaningcloud.com/products/corporate-reputation; as accessed on Dec. 15, 2016; May 1, 2015.

Gyan Ranjan; Systems and Methods for Collecting Organization-Specific Media Events; U.S. Appl. No. 15/151,688, filed May 11, 2016.

Gyan Ranjan; Systems and Methods for Automatically Inferring Brand Reputation Following Potentially Damaging Epochs; U.S. Appl. No. 15/151,706, filed May 11, 2016.

Nikhita Koul, et al; Systems and Methods for Creating Automatic Computer-Generated Classifications; U.S. Appl. No. 15/276,825, filed Sep. 27, 2016.

Hongyi Yao, et al.; Samples: Self Adaptive Mining of Persistent LExical Snippets for Classifying Mobile Application Traffic; https://www.sigmobile.org/mobicom/2015/papers/p439-yaoA.pdf; MobiCom'15; (Sep. 7-11, 2015).

Alshukri; A Framework for Brand Reputation Mining and Visualisation; http://link.springer.com/chapter/10.1007/978-3-319-12069-0_22, as accessed Mar. 21, 2016; Oct. 30, 2014.

Spangler; Cobra Mining Web for COrporate Brand and Reputation Analysis; https://www.researchgate.net/publication/220298401_COBRA_-_mining_web_for_COrporate_Brand_and_Reputation_Analysis, as accessed Mar. 21, 2016; Jan. 2009.

Alok Tongaonkar, et al.; Understanding Mobile App Usage Patterns Using In-App Advertisements; https://people.eecs.berkeley.edu/~dawnsong/papers/mobile%20app%20usage.pdf; PAM 2013, LNCS 7799; 2013.

Shuaifu Dai, et al; NetworkProfiler: Towards Automatic Fingerprinting of Android Apps; https://people.eecs.berkeley.edu/~dawnsong/papers/2013%20networkprofiler.pdf; IEEE INFOCOM 2013; 2013.

Alexander Ihler, et al.; Adaptive Event Detection with Time-Varying Poisson Processes; http://www.datalab.uci.edu/papers/event_detection_kdd06.pdf, as accessed Mar. 21, 2016; KDD 2006; 2006.

Wei Xu, et al.; Detecting Large-Scale System Problems by Mining Console Logs; https://pdfs.semanticscholar.org/0790/6bb4ff7dad272585ff4eea641ffb0107d545.pdf, as accessed Mar. 21, 2016 and http://dl.acm.org/citation.cfm?id=1629587, as accessed Mar. 21, 2016; Proceedings of the 26th International Conference on Machine Learning 2010 and Proceedings of the ACM SIGOPS 22nd Symposium on Operating Systems Principles 2009; 2009.

Ashish Patro, et al.; Capturing Mobile Experience in the Wild: A Tale of Two Apps; Presented at ACM Conext 2013; 2013.

Gyan Ranjan; Systems and Methods for Determining Security Risk Profiles; U.S. Appl. No. 15/151,734, filed May 11, 2016.

Gyan Ranjan, et al; Systems and Methods for Identifying Source Applications of Network Flows; U.S. Appl. No. 14/968,943, filed Dec. 15, 2015.

Narus (company); http://www.narus.com/, as accessed Oct. 15, 2015; May 8, 1999.

Stanislav Miskovic, et al.; AppPrint: Automatic Fingerprinting of Mobile Applications in Network Traffic; http://wan.poly.edu/pam2015/papers/3.pdf; Apr. 4, 2015.

(56) References Cited

OTHER PUBLICATIONS

Qiang Xu, et al; Automatic Generation of Mobile App Signatures from Traffic Observations; https://web.eecs.umich.edu/~zmao/Papers/infocom15-flowr.pdf; 2015.

Susanta K. Nanda, et al; Systems and Methods for Scalable Network Monitoring in Virtual Data Centers; U.S. Appl. No. 14/614,819, filed Feb. 5, 2015.

Daniel Marino, et al; Systems and Methods for Increasing Security on Computing Systems That Launch Application Containers; U.S. Appl. No. 14/697,016, filed Apr. 27, 2015.

Pang et al.; Thumbs up? Sentiment Classification Using Machine Learning Techniques, http://www.cs.cornell.edu/home/llee/papers/sentiment.home.html, as accessed Mar. 31, 2017, published in 2002.

Peter Turney; Thumbs Up or Thumbs Down? Semantic Orientation Applied to Unsupervised Classification of Reviews; http://acl-arc.comp.nus.edu.sg/archives/acl-arc-090501d4/data/pdf/anthology-PDF/P/P02/P02-1053.pdf, as access on Mar. 31, 2017, published in 2002.

Hu et al.; Mining and Summarizing Customer Reviews; https://www.cs.uic.edu/~liub/publications/kdd04-revSummary.pdf, as accessed Mar. 31, 2017, published in 2004.

B. Liu et al.; Opinion Observer: Analyzing and Comparing Opinions on the Web; https://www.cs.uic.edu/~liub/publications/www05-p536.pdf, as accessed Mar. 31, 2017, published in 2005.

Melville et al.; Sentiment Analysis of Blogs by Comparing Lexical Knowledge with Text Classification; sites.google.com/site/premmelville/pooling-multinomials-kdd09.pdf, as accessed Mar. 31, 2017, published in 2009.

Vangie Beal; URI—Uniform Resource Locator; http://www.webopedia.com/TERM/U/URL.html, as accessed May 5, 2016.

Margaret Rouse; brand; http://whatis.techtarget.com/definition/brand, as accessed May 5, 2016.

International Search Report and Written Opinion received for International Patent Application Serial No. PCT/US2016/069025 dated Apr. 28, 2017, 9 pages.

International Preliminary Report on Patentability received for International Patent Application Serial No. PCT/US2016/069025 dated Sep. 20, 2018, 8 pages.

International Search Report and Written Opinion received for International Patent Application Serial No. PCT/US2017/026181 dated Jul. 28, 2017, 10 pages.

International Preliminary Report on Patentability received for International Patent Application Serial No. PCT/US2017/026181 dated Nov. 22, 2018, 9 pages.

\* cited by examiner

SYSTEMS AND METHODS FOR AUTOMATED CLASSIFICATION OF APPLICATION NETWORK ACTIVITY

BACKGROUND

As increasing volumes of information are digitally transmitted over networks, individuals and organizations may seek improved ways to control and/or analyze such network traffic. Some methods of controlling network traffic rely on the ability to classify various network streams according to the type of information carried by that network stream. Classifying network traffic may be used in a variety of contexts, including enforcement of network-traffic policies and/or identification of malware. For example, an organization may block network streams categorized under the "social media" classification.

Unfortunately, traditional methods for identifying and classifying network streams may require prior knowledge of the application that generated the network stream in order to properly identify and analyze the network stream. Other traditional methods for identifying and classifying network streams may require a software agent to be present on endpoint devices that generate network streams. Furthermore, traditional methods for classifying network activity may simply classify network traffic based on the application that generated the network stream and accordingly fail to provide adequately fine-grained control that would allow an administrator to control network traffic on a case-by-case basis. The instant disclosure therefore identifies and addresses a need for improved systems and methods to automatically classify application network activity.

SUMMARY

As will be described in greater detail below, the instant disclosure describes various systems and methods for automated classification of application network activity by assigning classifications to network streams based on keywords extracted from the headers of those streams. In one example, a computer-implemented method for automated classification of application network activity may include (1) building a lexicon dictionary that includes lexical keywords, (2) identifying, at a network vantage point, a network stream that represents a communication between an application and a server, (3) extracting, through a lexical analysis that utilizes the lexicon dictionary, a set of keywords from one or more header fields of the network stream, and (4) classifying the network stream based on activity types associated with each keyword in the set of keywords that were extracted from the header fields of the network stream. Network streams whose headers contain a given lexical keyword may represent communications of an activity type that is associated with the given lexical keyword in the lexicon dictionary. In one embodiment, the network stream may include a Hypertext Transfer Protocol (HTTP) stream. Additionally, in some embodiments, the network vantage point may include a router, a server, a gateway, a switch, a network interface device, and/or a network hub.

In some examples, building the lexicon dictionary may include executing a known application in a sandboxed environment, causing the known application to generate a network stream by performing an action on the application, extracting at least one keyword from the header of the generated network stream, and associating the observed keywords with the action that caused the known application to generate the generated network stream. Furthermore, building the lexicon dictionary may include adding user-defined lexical keywords to the lexicon dictionary. Additionally or alternatively, building the lexicon dictionary may include adding user-defined associations between lexical keywords and activity types to the lexicon dictionary.

In some embodiments, extracting the set of keywords from the one or more header fields may include tokenizing the header field. In some examples, tokenizing the header field may include tokenizing the header field along non-alphanumeric delimiter characters.

Methods described herein may classify network streams in a variety of ways. In some examples, classifying the network stream may include assigning a particular classification to the network stream based on the presence of more than one particular keyword extracted from the header fields of the network stream. Furthermore, the computer-implemented method may include adding the classification of the network stream to a state profile of the application that describes, for a particular moment in time, the classifications of more than one network stream generated by the application.

In some examples, the computer-implemented method may further include providing the classification of the network stream to a network management system that enforces a network traffic policy. Additionally or alternatively, the computer-implemented method may further include providing the classification of the network stream to a software security system that protects a computing system against malware.

In one embodiment, a system for implementing the above-described method may include (1) a building module, stored in memory, that builds a lexicon dictionary that includes lexical keywords, (2) an identifying module, stored in memory, that identifies, at a network vantage point, a network stream that represents a communication between an application and a server, (3) an extracting module, stored in memory, that extracts, through a lexical analysis that utilizes the lexicon dictionary, a set of keywords from one or more header fields of the network stream, (4) a classifying module, stored in memory, that classifies the network stream based on activity types associated with each keyword in the set of keywords that were extracted from the header fields of the network stream, and (5) at least one physical processor configured to execute the building module, the identifying module, the extracting module, and the classifying module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) build a lexicon dictionary that includes lexical keywords, (2) identify, at a network vantage point, a network stream that represents a communication between an application and a server, (3) extract, through a lexical analysis that utilizes the lexicon dictionary, a set of keywords from one or more header fields of the network stream, and (4) classify the network stream based on activity types associated with each keyword in the set of keywords that were extracted from the header fields of the network stream.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
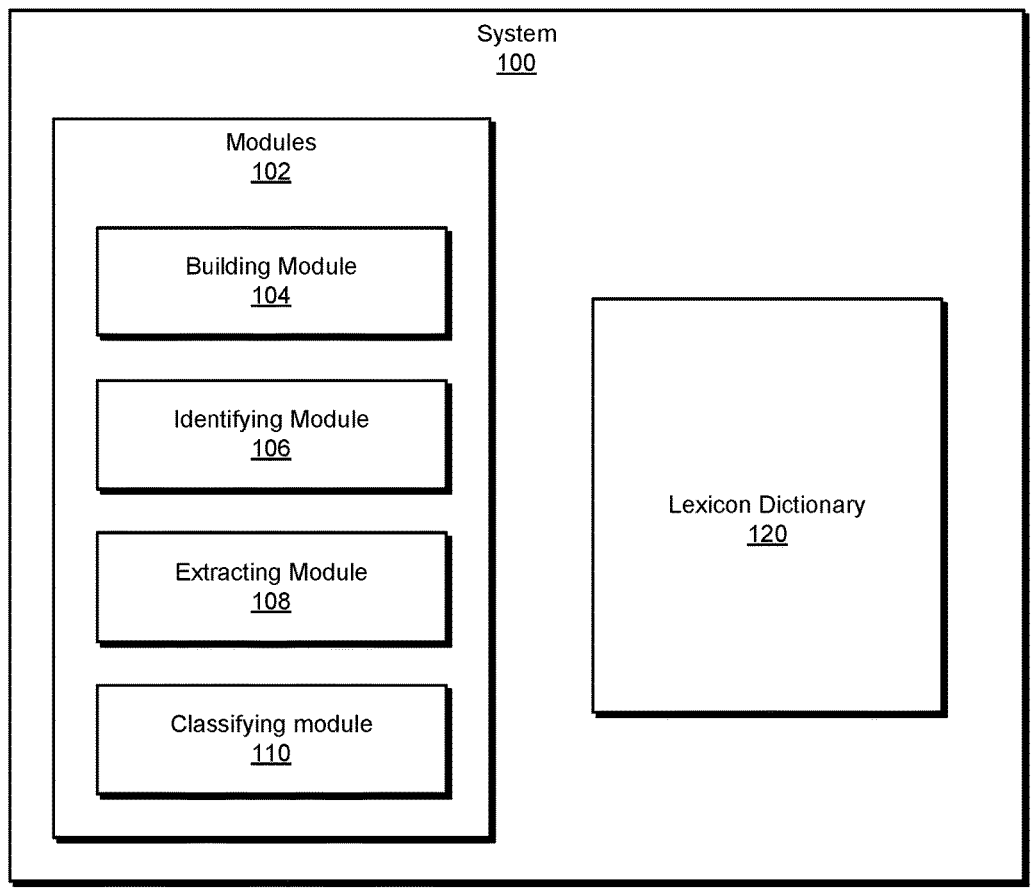
FIG. 1 is a block diagram of an exemplary system for automated classification of application network activity.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for automated classification of application network activity. As will be explained in greater detail below, the systems and methods described herein may enable the classification of network streams based on keywords extracted from the headers of those streams. Such classification may occur without any presence on endpoint devices and without needing to know the origin of the network stream.

Figure 2:
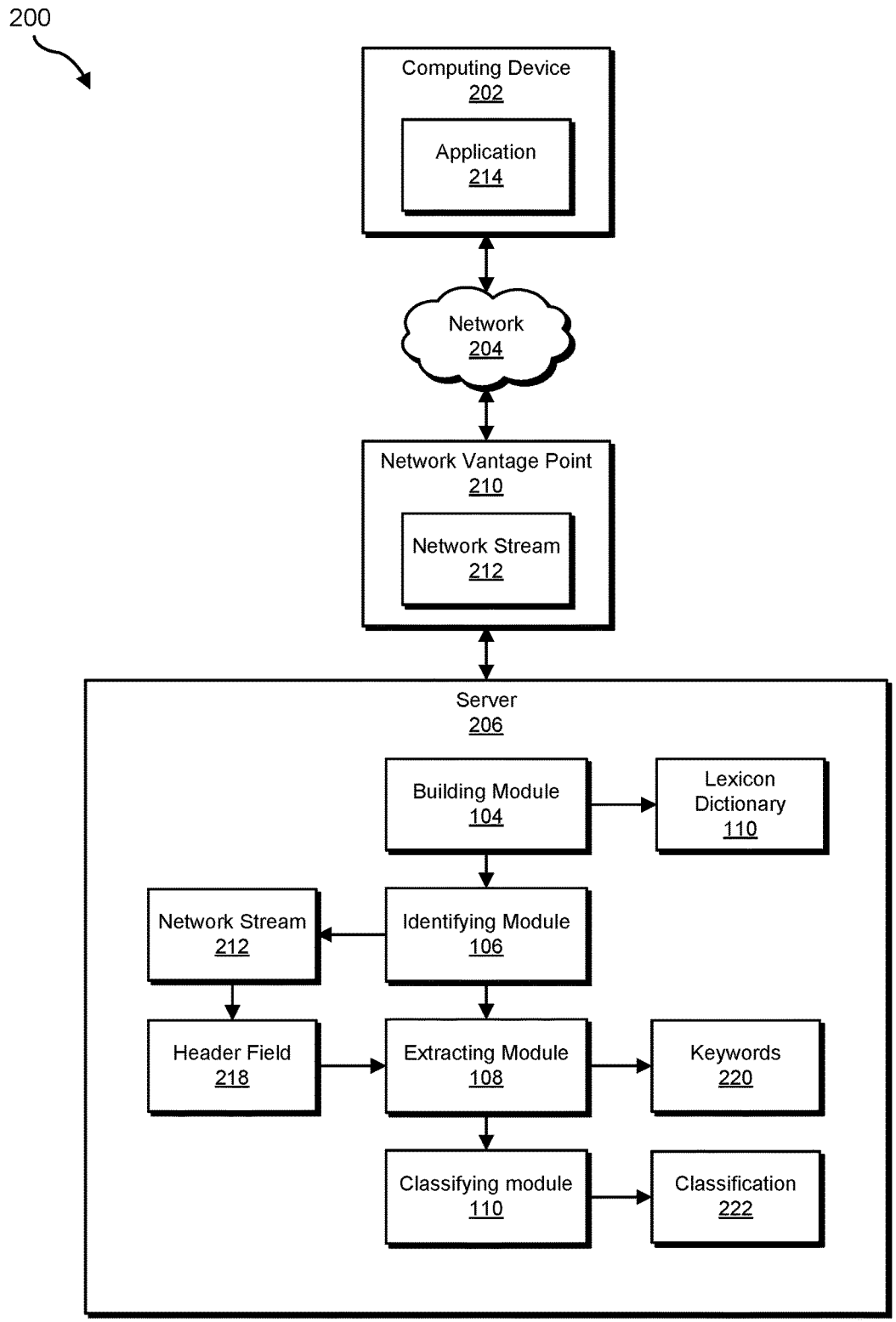
FIG. 2 is a block diagram of an additional exemplary system for automated classification of application network activity.

The following will provide, with reference to FIGS. 1-2, detailed descriptions of exemplary systems for automated classification of application network activity. Detailed descriptions of corresponding computer-implemented methods will also be provided in connection with FIG. 3. Detailed descriptions of exemplary systems for creation of a lexicon dictionary will be provided in connection with FIG. 4. Further detailed descriptions of exemplary systems for automatically classifying application network activity will be provided in connection with FIG. 5. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for automated classification of application network activity. As illustrated in this figure, exemplary system 100 may include one or more modules 102 for performing one or more tasks. For example, and as will be explained in greater detail below, exemplary system 100 may include a building module 104 that builds a lexicon dictionary 120 that includes lexical keywords. Network streams whose headers contain a given lexical keyword may represent communications of an activity type that is associated with the given lexical keyword in lexicon dictionary 120. Exemplary system 100 may additionally include an identifying module 106 that identifies, at a network vantage point, a network stream that represents a communication between an application and a server. Exemplary system 100 may further include an extracting module 108 that extracts, through a lexical analysis that utilizes lexicon dictionary 120, a set of keywords from one or more header fields of the network stream. Moreover, exemplary system 100 may include a classifying module 110 that classifies the network stream based on activity types associated with each keyword in the set of keywords that were extracted from the header fields of the network stream. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102. Additionally or alternatively, server 206 may be programmed with one or more of modules 102.

In one embodiment, one or more of modules 102 from FIG. 1 may, when executed by at least one processor of computing device 202 and/or server 206, enable computing device 202 and/or server 206 to classify network streams based on keywords present in the headers of the network streams. For example, and as will be described in greater detail below, one or more of modules 102 may cause computing device 202 and/or server 206 to automate classification of application network activity. For example, and as will be described in greater detail below, building module 104 may build a lexicon dictionary 120 that includes lexical keywords 220. Network streams whose headers contain a given lexical keyword represent communications of an activity type that is associated with the given lexical keyword in lexicon dictionary 120. Identifying module 106 may identify, at a network vantage point 210, a network stream 212 that represents a communication between an application 214 and a server 206. Extracting module 108 may extract, through a lexical analysis that utilizes lexicon dictionary

120, a set of keywords 220 from header field 218 of network stream 212. Classifying module 110 may classify network stream 212 based on activity types associated with each keyword in the set of keywords 220 that were extracted from the header fields of network stream 212.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Server 206 generally represents any type or form of computing device that is capable of extracting keywords from the headers of network streams. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

The term "network vantage point," as used herein, generally refers to any device, hardware, and/or software that provides a view of network traffic between many endpoints. For example, a network vantage point may a router, a server, a gateway, a switch, a network interface device, a network hub, virtualized variants of one or more of the same, combinations of one or more of the same, or any other suitable device and/or software that controls and/or facilitates network-based communications between devices and/or applications.

The terms "dictionary," "lexicon dictionary," and their derivatives, as used herein, generally refer to a collection of short text strings, generally a single word or acronym that may be used to identify meaningful elements in the header fields of network streams. These short text strings and meaningful elements may also be referred to herein as "lexical keywords" or "keywords." Each lexical keyword stored in the lexicon dictionary may be stored in association with a network stream classification, application action, and/or any other relevant information. The systems and methods described herein may store all or a portion of a lexicon dictionary in a database.

Figure 3:
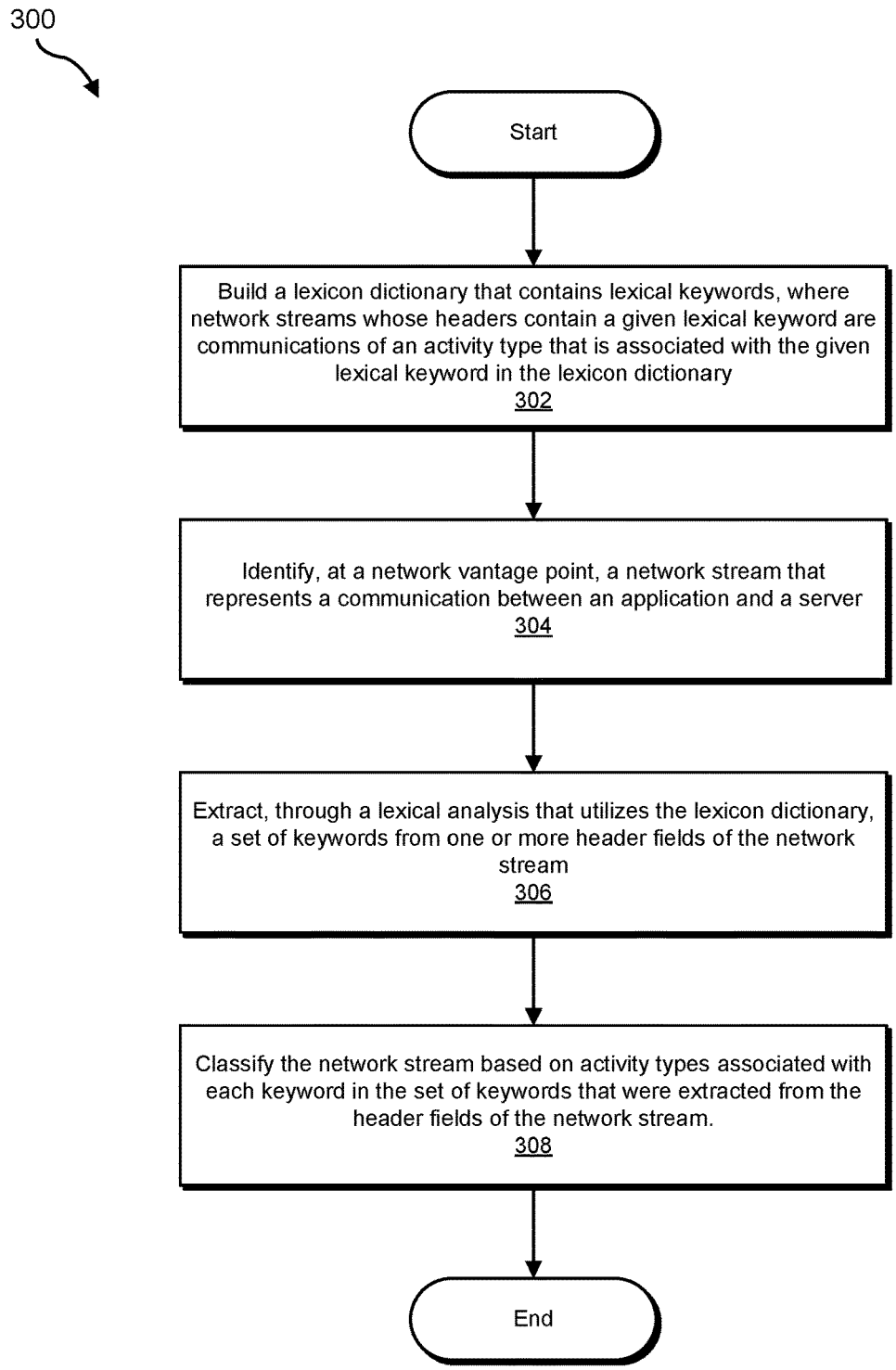
FIG. 3 is a flow diagram of an exemplary method for automated classification of application network activity.

FIG. 3 is a flow diagram of an exemplary computer-implemented method 300 for automated classification of application network activity. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may build a lexicon dictionary that includes lexical keywords. Network streams whose headers contain a given lexical keyword may represent communications of an activity type that is associated with the given lexical keyword in the lexicon dictionary. For example, building module 104 may, as part of computing device 202 in FIG. 2, build a lexicon dictionary 120 that may include lexical keywords 220.

Building module 104 may utilize fully and/or partially automated methods to build lexicon dictionary 120. For example, building module 104 may build the lexicon dictionary by executing a known application in a sandboxed environment, and causing the known application to generate a network stream by performing an action on the application. Building module 104 may also perform a variety of actions on the application, such as opening the application, closing the application, causing the application to open a file, etc. Building module 104 may then extract observed keywords from the header of the generated network stream, and associate the observed keywords with the action that caused the known application to generate the generated network stream.

As a specific example, building module 104 may execute a social media program, such as SKYPE, in a sandboxed environment. Building module 104 may then perform a variety of actions on SKYPE, such as issuing an "add contact" request, initiating a voice call, sending a text message, or any other suitable action that is part of expected behavior and/or functionality for SKYPE. These actions may cause SKYPE to generate network streams as it attempts to process the actions performed by building module 104. Building 104 may then extract keywords from the headers of each network stream and associate the keywords extracted from the headers of each network stream with the action that caused SKYPE to generate the network stream. In some embodiments, a single user-initiated action may cause an application to perform multiple actions in response to the user-initiated action. For example, an "add contact" user-initiated request may cause SKYPE to generate multiple network streams: a message to the recipient of the contact request, a database update for the user that initiated the request, and/or an authentication request to ensure that the user initiating the contact request is who they claim to be. In such examples, building module 104 may associate the resulting network streams with the user-initiated action, the application's response actions, or both.

Additionally or alternatively, building module 104 may build lexicon dictionary 120 by adding user-defined lexical keywords to lexicon dictionary 120. For example, an administrator may be aware of certain keywords that are frequently found in network stream headers and accordingly add these keywords to lexicon dictionary 120. Furthermore, building module 104 may add user-defined associations between lexical keywords and activity types to lexicon dictionary 120. Again, an administrator may have prior knowledge of associations between lexical keywords and network stream classifications, and accordingly add these associations to lexicon dictionary 120. As a specific example of the above-described process, a system administrator may have prior knowledge that a network stream destined for the network address "http://media.admob.com" contains the lexical keyword "admob," which indicates that the network stream is likely to be related to advertising functionality in the application. Accordingly, the administrator may cause building module 104 to add the keyword "admob" to lexicon dictionary 120 in association with the classification "advertising."

Figure 4:
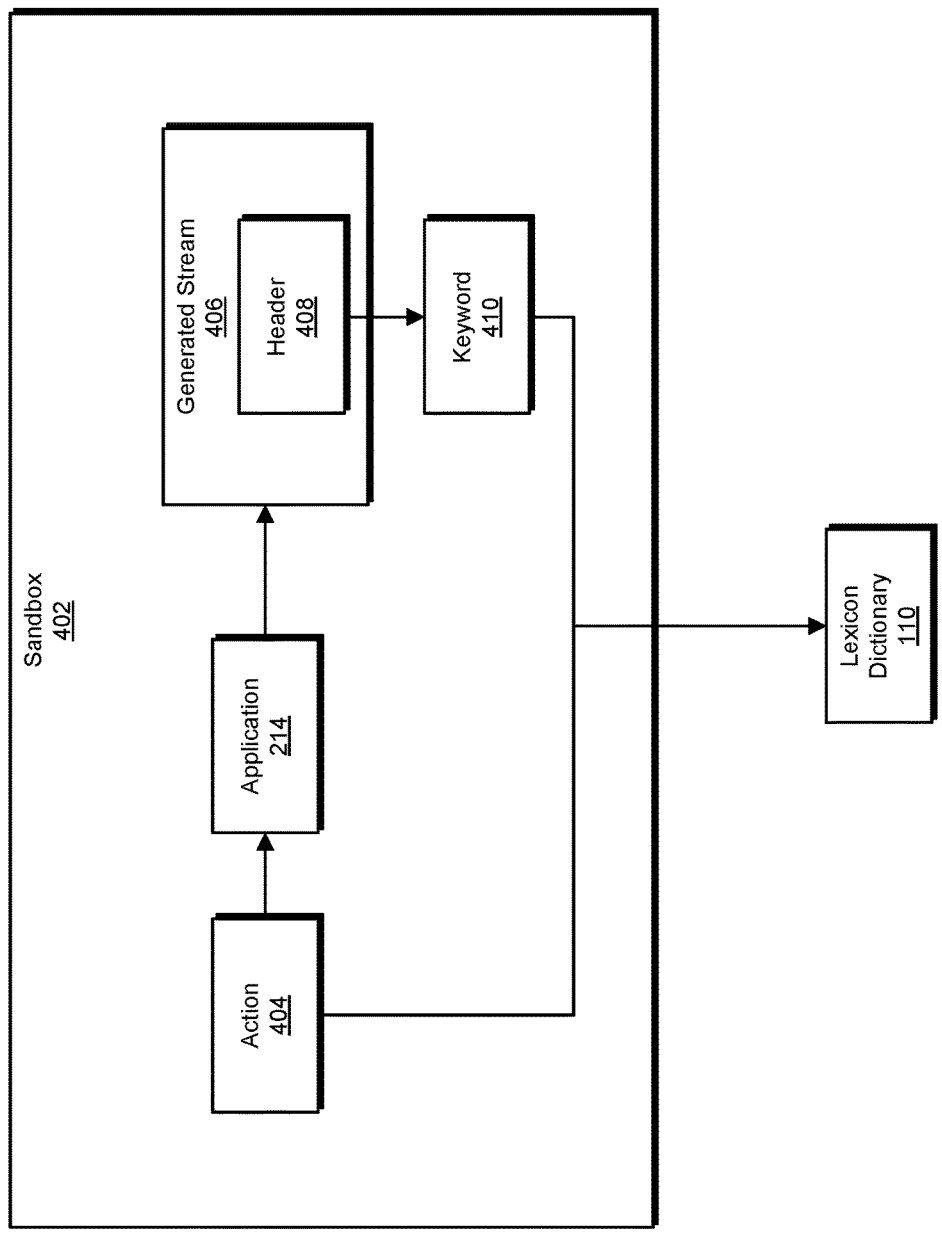
FIG. 4 is a block diagram of an exemplary computing system for creating a lexicon dictionary.
Figure 5:
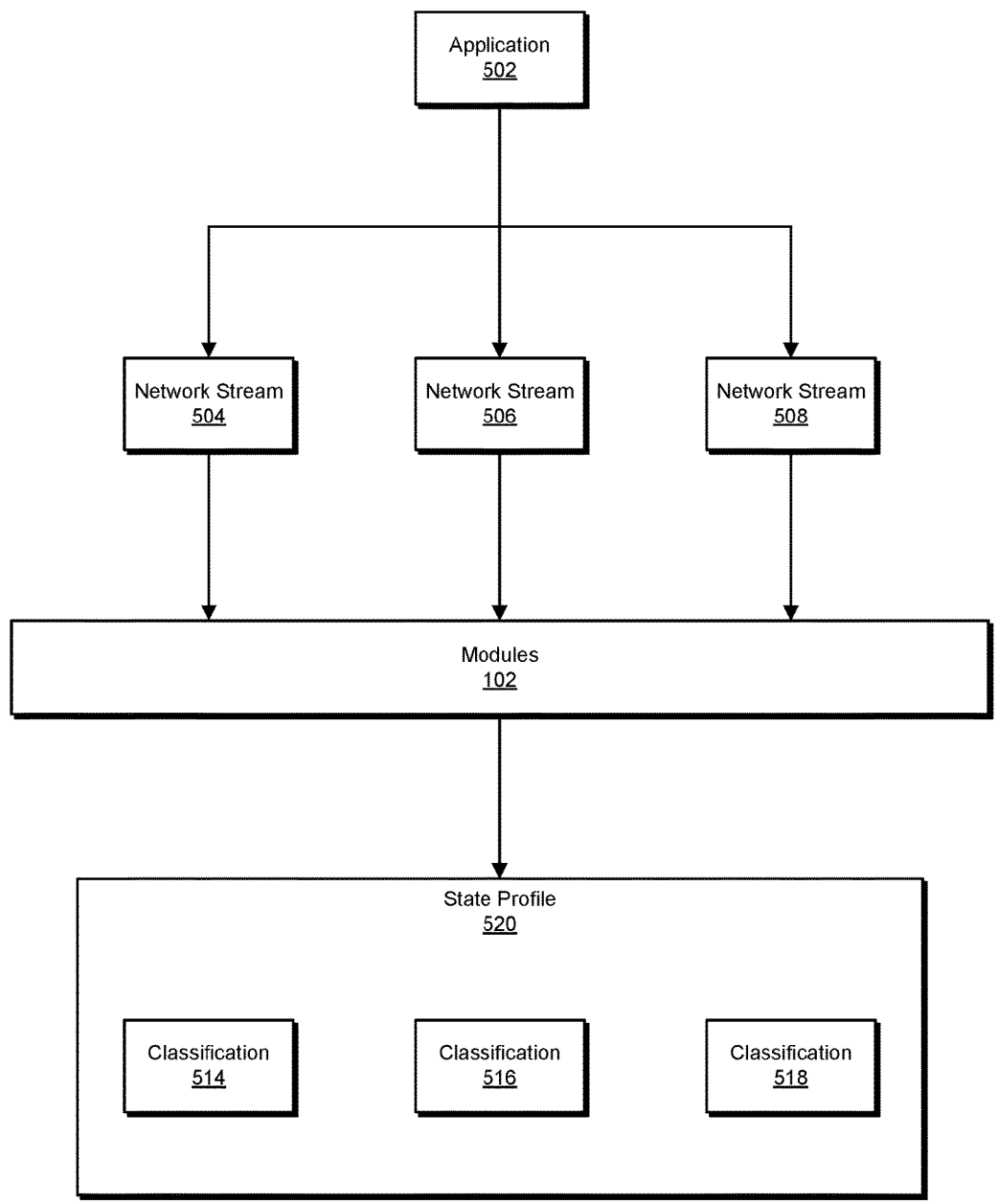
FIG. 5 is a block diagram of an exemplary computing system for automated classification of application network activity.

An illustrated example of the dictionary creation process is provided in connection with FIG. 4. As shown in FIG. 4, the systems and methods described herein may execute application 214 in a sandbox 402, and perform action 404 on application 214. Performing action 404 on application 214 may cause application 214 to generate a network stream, illustrated as generated stream 406. Generated stream 406 may include a header 408 that contains a variety of lexical keywords. In this example, building module 104 (not illustrated in FIG. 4) may extract keyword 410 from header 408 of generated stream 406, associate keyword 410 with action 404, and store the associated keyword and action in lexicon dictionary 120.

At step 304 in FIG. 3, one or more of the systems described herein may identify, at a network vantage point, a network stream that represents a communication between an application and a server. For example, identifying module 106 may, as part of computing device 202 in FIG. 2, identify, at network vantage point 210, network stream 212 that represents a communication between application 214 and server 206.

Identifying module 106 may identify a variety of network streams in a variety of ways. In one embodiment, the network stream may represent a Hypertext Transfer Protocol (HTTP) stream. HTTP streams generally include headers that are formatted according to a particular convention. That is, a given header field of an HTTP stream is likely to contain similar information as the same field in the header of a different HTTP stream. This knowledge may allow the systems and methods described herein to assign significance to extracted lexical keywords based on which field they were extracted from. Naturally, the systems and methods described herein are not limited to only analyzing HTTP network streams. For example, identifying module 106 may identify a File Transfer Protocol (FTP) stream, Simple Mail Transfer Protocol (SMTP) stream, or any other suitable network stream. In some embodiments, identifying module 106 may specifically identify network streams of a particular type while ignoring other types of network activity. For example, identifying module 106 may preferentially identify HTTP streams while ignoring FTP streams.

Furthermore, identifying module 106 may identify the network stream in a variety of contexts. For example, identifying module 106 may identify network streams that are passing through a network router that is placed to handle most or all network traffic for a particular geographic region, such as an office building. In such examples, identifying module 106 may operate as part of a firewall or other operating software that facilitates the operation of the router. Similarly, identifying module 106 may operate as part of an access point that serves a particular area. Additionally or alternatively, identifying module 106 may operate on a more granular level. Specifically, identifying module 106 may identify network streams passing in and/or out of a single computing device, such as a mobile phone. In such examples, identifying module 106 may operate as part of a security application installed on the computing device.

At step 306 in FIG. 3, one or more of the systems described herein may extract, through a lexical analysis that utilizes the lexicon dictionary, a set of keywords from one or more header fields of the network stream. For example, extracting module 108 may, as part of computing device 202 in FIG. 2, extract, through a lexical analysis that utilizes lexicon dictionary 120, keywords 220 from header field 218 of network stream 212.

Extracting module 108 may extract keywords from header field 218 in a variety of ways. In some examples, extracting module 108 may extract the set of keywords from the one or more header fields by tokenizing the header field. Because many network stream headers incorporate network addresses that follow well-established protocols, tokenizing the header field may include tokenizing the header field along non-alphanumeric delimiter characters. For example, a header field may contain a Uniform Resource Locator (URL), such as "media.admob.com" as a text string. Extracting module 108 may tokenize this text string by breaking it along the non-alphanumeric characters into the lexical keywords, "media," "admob," and "com." Additionally or alternatively, extracting module 108 may apply a series of regular expressions that match known lexical keywords from lexicon dictionary 120 and use the set of text strings in header field 218 that match one or more of the regular expressions as keywords 220. In general, extracting module 108 may use any suitable text analysis method to extract keywords from header fields.

Returning to FIG. 3 at step 308, one or more of the systems described herein may classify the network stream based on activity types associated with each keyword in the set of keywords that were extracted from the header fields of the network stream. For example, classifying module 110 may, as part of computing device 202 in FIG. 2, classify network stream 212 based on activity types associated with keywords 220 that were extracted from header field 218 of network stream 212.

Classifying module 110 may classify network stream 212 in a variety of ways. For example, classifying module 110 may assign a classification to network stream 212 based on an association between keywords 220 and a particular class of network stream. In some embodiments, lexicon dictionary 120 may map each lexical keyword to a specific value or classification of network stream. Classifying module 108 may accordingly use one or more of keywords 220 as keys to look up the associated values, or types of associated application activity. As a specific example, lexicon dictionary 120 may map the keyword "oauth" to the value "authentication." Classifying module 108 may accordingly classify network streams whose headers contain the "oauth" lexical keyword as authentication-type application activity.

Classifying module 110 may classify the network stream by assigning a particular classification to the network stream based on the presence of more than one particular keyword extracted from the header fields of the network stream. For example, classifying module 110 may classify network stream 212 based on each keyword extracted from the header of network stream 212. As a specific instance of such an example, one or more of modules 102 may extract keywords corresponding to "social media" and "chat request" from network stream 212. Classifying module 110 may accordingly classify network stream 212 as both a "social media" class stream as well as a "chat request" class stream. Additionally or alternatively, classifying module 110 may assign hierarchical classifications to network stream 212. For example, "chat request" may be a child class of the "social media" class of network stream. Classifying network stream 212 as a "chat request" stream may thus inherently also classify network stream 212 as a "social media" class of network stream.

In some embodiments, classifying module 110 may provide all or a portion of its results to outside systems. For example, classifying module 110 may provide the classification of the network stream to a network management system that enforces a network traffic policy. These systems may use the classifications provided by classifying module 110 to perform a variety of tasks. For example, a network management system may enforce a data-loss prevention (DLP) policy by blocking network streams of a particular classification. Such granular control over network traffic may allow applications to conduct network activity, and thus have access to a broader range of functionality, that might otherwise be blocked when using traditional methods to enforce network traffic policies. As a specific example, a first application and a second application executing on a computing device may each generate two network streams. The first application may generate an upload network stream and a download network stream, while the second application may generate a download network stream and an advertising-related network stream. However, a network-traffic controller may block the computing device from download activity and accordingly block the download streams generated by the first and second applications. The network-traffic controller may pass the upload network stream from the first application and the advertising-related network stream from the second application, thus allowing the applications greater functionality than they might otherwise have when using a less fine-grained approach to network-traffic management.

As an additional example, classifying module 110 may provide the classification of the network stream to a software security system that protects a computing system against malware. The software security system may use the classification of the network stream as part of an analysis to determine whether or not an application is exhibiting behavior that might be harmful to the computing system. As a specific example, a software security system may be aware that a word processing application is unlikely to create file transfer network streams. As such, if the software security system determines that a particular network stream is classified as a file transfer network stream and was generated by a word processing application, the software security system may determine that the word processing application is exhibiting potentially malicious behavior and respond accordingly.

Furthermore, systems described herein may include adding the classification of the networks stream to a state profile of the application that describes, for a particular moment in time, the classifications of more than one network stream generated by the application. Various other systems and/or methods may use such a state profile for a variety of purposes including but not limited to malware detection and/or other forms of software analysis. An illustrated example of classifying module 110 adding classifications to a state profile is provided in connection with FIG. 5. As illustrated, an application 502 may generate network streams 504, 506, and 508. As described above, one or more of modules 102 may identify these network streams, extract keywords from the headers, and classify the network streams based on the keywords extracted from the headers. Classifying module 110 may accordingly, as part of modules 102 in FIG. 5, assign classifications 514, 516, and 518 to network streams 504, 506, and 508, respectively, and add these classifications to a state profile 520 that describes, at a given point in time, the classifications of active network streams generated by application 502.

As described in greater detail above, the systems and methods described herein may enable a computing device to analyze and classify network streams, even in the absence of a presence on the endpoint device that hosts the application that generated the network stream. The systems and methods described herein may accomplish this by extracting lexical keywords from the headers of the network streams. These keywords may then be used to classify the network streams according to information stored in a previously generated lexicon dictionary that stores lexical keywords in association with the classes of network streams that the keywords represent.

Figure 6:
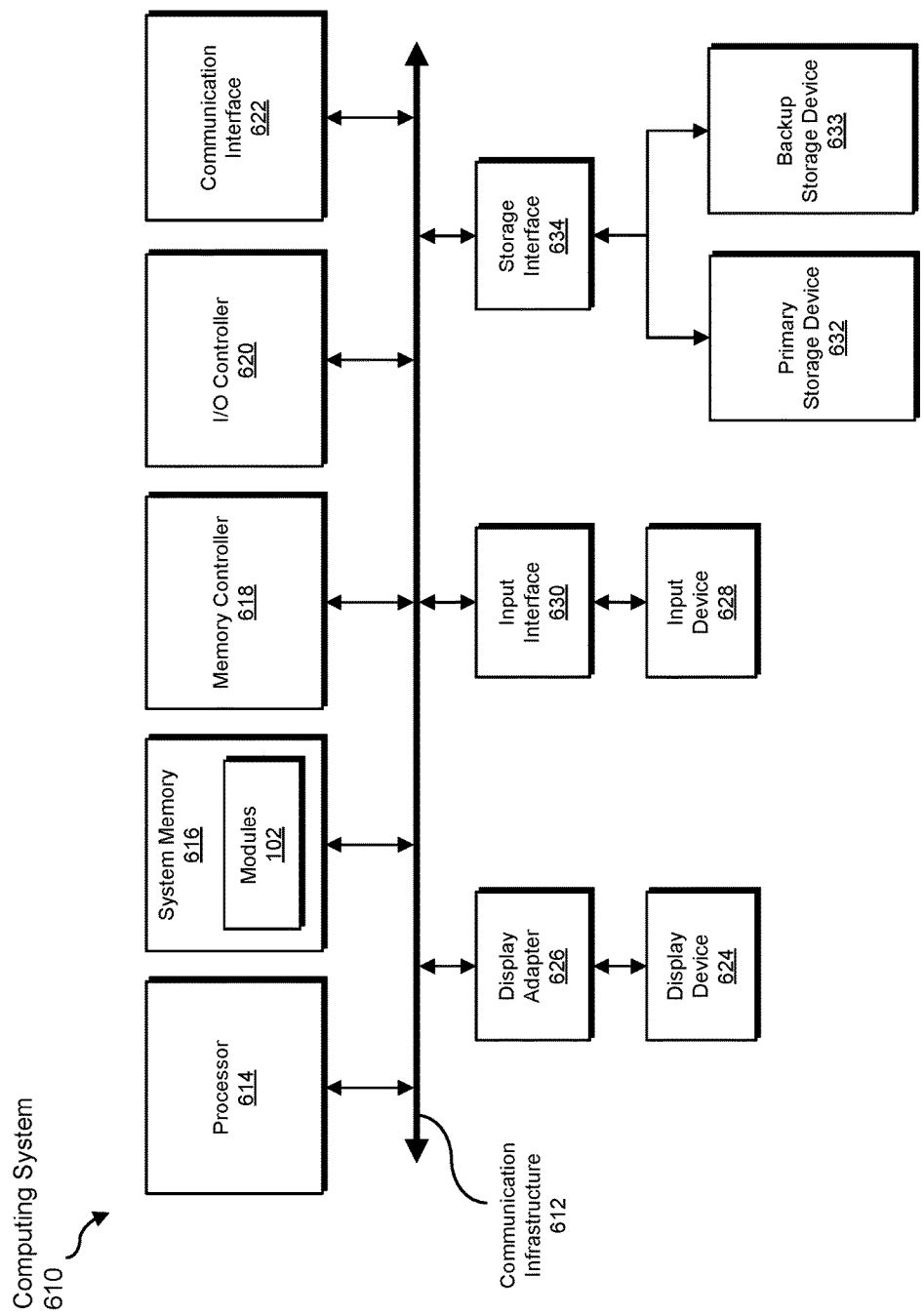
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
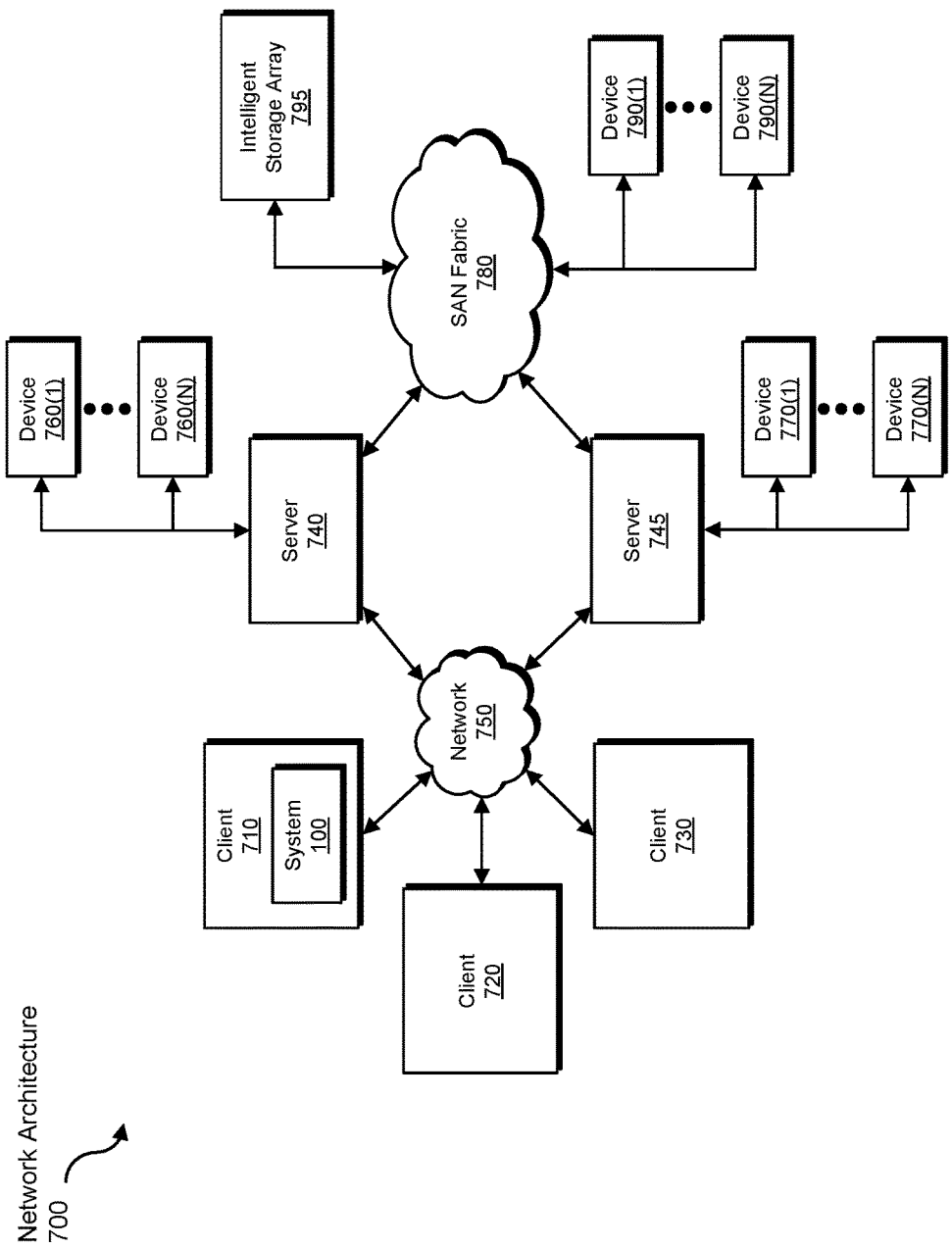
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for automated classification of application network activity.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may identify a network stream to be transformed, extract header information from the network stream, extract a collection of keywords from the header, transform the collection of keywords into a classification of the network stream, apply the classification to a state profile that represents network activity generated by the application, store a result of the classification in a database, provide a result of the classification to a malware detection system, and/or provide a result of the classification to a network-traffic control system. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for automated classification of application network activity, at least a portion of the method being performed by a computing device comprising at least one processor, the method comprising:
  building, by the at least one processor, a lexicon dictionary that comprises lexical keywords by;
    performing an action on an application that causes the application to generate one or more network streams;

extracting keywords from headers of the one or more network streams; and associating, within the lexicon dictionary, the keywords extracted from the headers of the one or more network streams with the action that caused the application to generate the one or more network streams;

identifying, by the at least one processor and at a network vantage point, an additional network stream that represents a communication between an additional application and a server;

extracting, by the at least one processor, through a lexical analysis that utilizes the lexicon dictionary, a set of keywords from one or more header fields of the additional network stream;

assigning, by the at least one processor, at least one activity type and action to the additional network stream based on actions associated, within the lexicon dictionary, with each keyword in the set of keywords that were extracted from the header fields of the additional network stream; and enforcing a network policy on the additional network stream based on the at least one activity type of the additional network stream.

2. The method of claim 1, wherein building the lexicon dictionary comprises:

extracting at least one observed keyword from the header of the generated network stream; and associating the observed keywords with the action that caused the application to generate the generated network stream.

3. The method of claim 1, wherein building the lexicon dictionary comprises adding user-defined lexical keywords to the lexicon dictionary.

4. The method of claim 1, wherein building the lexicon dictionary comprises adding user-defined associations between lexical keywords and activity types to the lexicon dictionary.

5. The method of claim 1, further comprising adding the classification of the network stream to a state profile of the application that describes, for a particular moment in time, classifications of more than one network stream generated by the application.

6. The method of claim 1, wherein classifying the network stream comprises assigning a particular classification to the network stream based on the presence of more than one particular keyword extracted from the header fields of the network stream.

7. The method of claim 1, wherein extracting the set of keywords from the one or more header fields comprises tokenizing the header field.

8. The method of claim 7, wherein tokenizing the header field comprises tokenizing the header field along non-alphanumeric delimiter characters.

9. The method of claim 1, further comprising providing the classification of the network stream to a software security system that protects a computing system against malware.

10. The computer-implemented method of claim 1, wherein the network policy is at least one of a network traffic policy or a network security policy.

11. A system for automated classification of application network activity, the system comprising:

a building module, stored in memory, that builds a lexicon dictionary that comprises lexical keywords by:

performing an action on an application that causes the application to generate one or more network streams;

extracting keywords from headers of the one or more network streams; and associating, within the lexicon dictionary, the keywords extracted from the headers of the one or more network streams with the action that caused the application to generate the one or more network streams;

an identifying module, stored in memory, that identifies, at a network vantage point, an additional network stream that represents a communication between an additional application and a server;

an extracting module, stored in memory, that extracts, through a lexical analysis that utilizes the lexicon dictionary, a set of keywords from one or more header fields of the additional network stream;

a classifying module, stored in memory, that assigns at least one activity type and action to the additional network stream based on actions associated, within the lexicon dictionary, with each keyword in the set of keywords that were extracted from the header fields of the additional network stream;

a network policy subsystem, stored in memory, that enforces a network policy on the additional network stream based on the at least one activity type of the additional network stream; and at least one physical processor configured to execute the building module, the identifying module, the extracting module, and the classifying module.

12. The system of claim 11, wherein the building module builds the lexicon dictionary by:

extracting at least one observed keyword from the header of the generated network stream; and associating the observed keywords with the action that caused the application to generate the generated network stream.

13. The system of claim 11, wherein the building module builds the lexicon dictionary by adding user-defined lexical keywords to the lexicon dictionary.

14. The system of claim 11, wherein the building module builds the lexicon dictionary by adding user-defined associations between lexical keywords and activity types to the lexicon dictionary.

15. The system of claim 11, wherein the classifying module adds the classification of the network stream to a state profile of the application that describes, for a particular moment in time, classifications of more than one network stream generated by the application.

16. The system of claim 11, wherein the classifying module classifies the network stream by assigning a particular classification to the network stream based on the presence of more than one particular keyword extracted from the header fields of the network stream.

17. The system of claim 11, wherein the extracting module extracts the set of keywords from the one or more header fields by tokenizing the header field.

18. The system of claim 11, wherein the network policy is at least one of a network traffic policy or a network security policy.

19. A non-transitory computer-readable medium comprising one or more computer-readable instructions that, when executed by at least one processor of a computing device, cause the computing device to:

build a lexicon dictionary that comprises lexical keywords by:

performing an action on an application that causes the application to generate one or more network streams;

extracting keywords from headers of the one or more network streams; and associating, within the lexicon dictionary, the keywords extracted from the headers of the one or more network streams with the action that caused the application to generate the one or more network streams;

identify, at a network vantage point, an additional network stream that represents a communication between an additional application and a server;

extract, through a lexical analysis that utilizes the lexicon dictionary, a set of keywords from one or more header fields of the additional network stream;

assign, by the at least one processor, at least one activity type to the additional network stream based on actions associated, within the lexicon dictionary, with each keyword in the set of keywords that were extracted from the header fields of the additional network stream; and enforce a network policy on the additional network stream based on the at least one activity type of the additional network stream.

20. The non-transitory computer-readable medium of claim 19, wherein the network policy is at least one of a network traffic policy or a network security policy.

* * * * *